United States Patent [19]

Keeton

[11] 4,403,881
[45] Sep. 13, 1983

[54] HAND HELD HERBICIDE APPLICATOR WITH FLEXIBLE CAP AND VALVE ELEMENT

[76] Inventor: John H. Keeton, P.O. Box 296, Campbellsville, Ky. 42718

[21] Appl. No.: 283,879

[22] Filed: Jul. 16, 1981

[51] Int. Cl.³ .................. B43K 5/00; A01M 21/00
[52] U.S. Cl. ................................ 401/202; 47/1.5
[58] Field of Search .............. 47/1.5; 401/188, 202, 401/203, 261, 262

[56] References Cited

U.S. PATENT DOCUMENTS

| | | | |
|---|---|---|---|
| 564,614 | 7/1896 | Gunn | 401/188 X |
| 801,087 | 10/1905 | Kahn | 401/202 |
| 1,648,793 | 11/1927 | Weber | 137/845 X |
| 1,740,043 | 12/1929 | Shatzer | 401/202 X |
| 2,069,673 | 2/1937 | Lima | 221/114 |
| 2,226,663 | 12/1940 | Hill et al. | 401/188 X |
| 2,896,661 | 7/1959 | Becker et al. | 137/845 X |
| 3,021,642 | 2/1962 | Ewing | 47/1.5 |
| 3,078,010 | 2/1963 | Ichikawa et al. | 222/3 |
| 3,811,466 | 5/1974 | Ohringer | 137/845 X |
| 4,027,986 | 6/1977 | Patrick | 47/1.5 |
| 4,276,718 | 7/1981 | Keeton et al. | 47/1.5 |
| 4,291,491 | 9/1981 | Maddock | 47/1.5 |

*Primary Examiner*—James R. Feyrer
*Attorney, Agent, or Firm*—Cushman, Darby & Cushman

[57] ABSTRACT

A portable liquid applicator device is provided with a simple and effective valve assembly associated with a hollow handle designed to hold a liquid herbicide that can be applied by the device. A head portion of the device including a sponge or a like liquid applicator material is mounted on the opposite side of a plug valve element as a liquid-containing hollow handle portion. The plug is rubber and has a slit extending through it. A rubber cap on the end of the handle opposite the head portion can be flexed to apply an air pressure to liquid within the hollow handle. This forces the plug to flex and allows liquid to flow through the slit. The sponge is held by the head portion so that it assumes a generally figure 8 configuration in end view, a portion being disposed within the head and a portion extending out from the head. A cover may be slipped on the portion extending out of the head.

8 Claims, 6 Drawing Figures

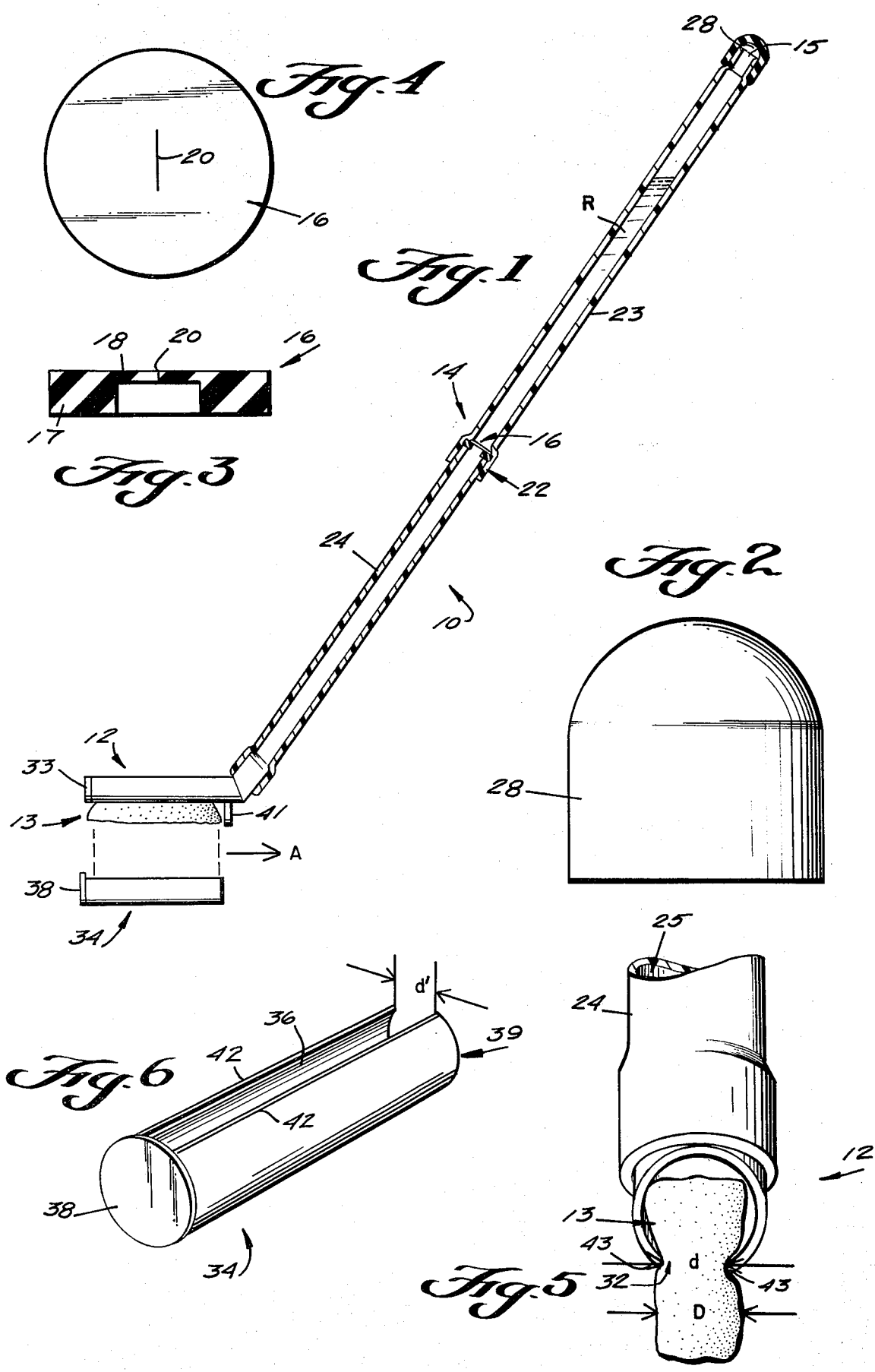

HAND HELD HERBICIDE APPLICATOR WITH FLEXIBLE CAP AND VALVE ELEMENT

BACKGROUND AND SUMMARY OF THE INVENTION

The invention relates to a portable liquid applicator device and valve and applicator cover assemblies associated therewith. The device is particularly useful for the application of liquid herbicide to plants, although it may be utilized for applying a wide variety of other liquids to a wide variety of other surfaces.

In copending application Ser. No. 276,188, filed June 22, 1981 and entitled "HOLLOW-HANDLED APPLICATOR HERBICIDE APPLYING" (the disclosure of which is hereby incorporated by reference herein) a structure is disclosed which provides a hollow handle for containing a supply of herbicide or other liquid, with a means for readily dispensing a predetermined amount of liquid from the handle to a liquid applicator device (such as a sponge). According to the present invention there is provided another portable liquid applicator device which will also function effectively to properly supply a desired amount of herbicide or other liquid to a plant or other surface, and which allows the supply of liquid to be replenished without inserting the applicator head into a container holding the liquid.

According to one aspect of the present invention a portable liquid applicator device comprises a liquid holding and releasing material, with means for mounting the liquid holding and releasing material so that it is at least partially exposed and may be brought into contact with objects. A hollow liquid-impermeable handle is operatively connected to the means for mounting the liquid holding and releasing material, and is adapted to hold liquid. A liquid permeable structure is disposed between the handle and the liquid holding and releasing material. Valve means, actuable by a valve actuator from the exterior of the handle, are disposed within the handle adjacent to the liquid permeable structure for metering the liquid from the handle hollow interior to the liquid permeable means. The valve means comprises a plug of flexible resilient material (e.g. rubber), and means defining a slit (e.g. about ¼" to ⅜") in the plug extending from one end thereof to the other. The slit is normally maintained by the flexible resilient material of the plug in a position preventing passage of liquid therethrough, but allows passage of liquid therethrough when the plug is flexed. The valve actuator comprises a cap of flexible, resilient material (e.g. rubber) disposed on the handle free end so that when it is flexed it applies a fluid pressure to liquid in the handle which subsequently effects flexing of the plug to allow passage of some liquid through the plug.

The rubber plug comprises a pressure responsive valve means, while the rubber cap provides an air pump means for pressuring the liquid. The valve assembly can also be utilized in other environments, but is particularly advantageously utilized in the liquid applicator structure according to the invention.

An elongated generally tubular head portion is provided for holding the liquid applicator material, which preferably comprises an elongated sponge. A slot in the head portion elongated in the same dimension as the dimension of elongation of the head portion receives the sponge therein, and holds it so that it has a general figure 8 shape when viewed from the end. An elongated generally tubular cover also has a slot formed therein comparable to the slot formed in the head portion, so that the cover can be slipped over the sponge to cover the portion thereof extending outwardly from the head portion.

It is the primary object of the present invention to provide a simple and effective device for the application of a liquid to a surface, particularly with an advantageous valve assembly. This and other objects of the invention will become clear from an inspection of the detailed description of the invention, and from the appended claims.

BRIEF DESCRIPTION OF THE DRAWINGS

FIG. 1 is a side view, partly in cross-section and partly in elevation, of an exemplary liquid applicator device according to the present invention;

FIG. 2 is a side view of a flexible, resilient material handle end cap for the device of FIG. 1;

FIG. 3 is a cross-sectional view of an exemplary valve plug of the device of FIG. 1;

FIG. 4 is a top plan view of the valve plug of FIG. 3;

FIG. 5 is an end view, with the end cap removed for clarity, of the head portion of the device of FIG. 1; and FIG. 6 is a perspective view of an exemplary cover utilized in the device of FIG. 1.

DETAILED DESCRIPTION OF THE DRAWINGS

An exemplary liquid applicator device according to the present invention is shown generally at 10 in FIG. 1. The basic components of the device include a head portion 12 including a liquid applicator material 13, and a handle portion 14 operatively connected at one end thereof (see portion 24) to the head portion 12, with the other end 15, being free. The liquid applicator material 13 may comprise any suitable structure, but as illustrated in the drawings preferably comprises a sponge having a length and a width, the width being a minimum distance D (see FIG. 5) at a central portion thereof.

The head portion 12 and the handle portion 14 preferably are both made of plastic pipe, circular in cross-section.

The device 10 further comprises valve means 16. The valve means 16 provide for selective flow of liquid from a liquid reservoir R (see FIG. 1) on one side thereof, ultimately to the liquid applicator 13 on the other side thereof. Preferably the reservoir R is provided in an upper portion of handle 14 (see portion 23), and may be filled by pouring liquid through an open end 15 of handle 14. The valve means 16 preferably comprises pressure responsive valve means normally maintained in a closed position, but when flexed, as upon the application of fluid pressure thereto, allowing the passage of liquid therethrough.

As illustrated most clearly in FIGS. 3 and 4, the valve means 16 preferably comprises a plug of flexible, resilient material such as rubber. The plug preferably has an outer annular portion 17 that is relatively thick, and is clamped in place to properly position the valve means 16; and an inner annular portion 18 that is relatively thin compared to the outer portion 17. Means are provided defining a slit 20 in the plug extending from one end thereof to the other. The slit 20 preferably is provided in the thin inner annular portion 18, and for most uses of the device 10 for applying liquid herbicide to plants would be about ¼" to ¾" long. The material of which the plug 17, 18 is constructed normally maintains the slit 20 closed, however when sufficient force is applied to flex the inner annular portion 18, some liquid can flow through the slot 20 until the force causing the flexing is terminated. Although the entire plug is illustrated as being of flexible resilient material in FIGS. 3 and 4, if desired the outer annular portion 17 could be formed of a different material as long as it was liquid impermeable, provided an appropriate seal to prevent liquid from flowing therearound, and was compatible with the flexible annular portion 18 to which it would be attached.

As illustrated in FIG. 1, the valve means 16 preferably is disposed at a junction 22 between upper 23 and lower 24 portions of the handle 14. The lower portion 24 of the handle is in communication with the head 12 and liquid applicator 13 via an opening 25 (see FIG. 5) extending straight from the hollow interior of the handle portion 24 to the head portion 12. Other liquid permeable means besides an open passageway 25 may be provided where desired, such as shown in said copending application Ser. No. 276,188 entitled "HOLLOW-HANDLED APPLICATOR HERBICIDE APPLYING".

The device 10 further comprises an actuator for actuating the valve means 16. Preferably the actuator takes the form of a cap 28 of flexible, resilient material removably disposed on the handle free end 15. The cap preferably is of rubber although other suitable flexible, resilient materials may be utilized. As illustrated most clearly in FIG. 1, the cap 28 fits on the end 15 so that the central portion of the cap 28 may be flexed by an operator pushing it in, and allowing return out. In this way the cap 28 acts as an air pump means.

When the cap 28 is flexed inwardly it pressurizes the liquid in reservoir R, causing the force to be transmitted to the valve means 16, and causing flexing of the inner annular portion 18, allowing some liquid to flow through the slit 20 until the pressure on either side of the valve means 16 is substantially equalized. As a predetermined amount of liquid is passed through the slit 20, air will be pulled from the handle portion 24 through the slit 20 into the reservoir R to take the place of the liquid displaced. In this way the cap 28 may be periodically flexed to provide an appropriate pressure to eventually discharge substantially all of the liquid from the reservoir R into the handle portion 24 and ultimately to the liquid applicator 13. In order to replenish the supply of liquid within the reservoir R, one need only remove the cap 28, pour liquid through the open end 15, and replace the cap 28.

The head portion 12, as previously described, preferably comprises a plastic pipe of substantially circular cross-section. Means are provided defining a slot 32 (see FIG. 5) in the head portion 12, the slot 32 elongated in the same dimension of elongation as the head portion 12. The slot 32 has a width d which is less than the dimension D of the sponge 13. Thus, when the sponge 13 is in operative communication with the head portion 12, a portion thereof is disposed within the head portion 12, a portion thereof is constricted by the slot 32, and another portion thereof extends outwardly from the head portion 12, as illustrated clearly in FIGS. 1 and 5. Thus the head portion 12 maintaining the sponge so that it has generally a figure 8 shape in end view (see FIG. 5). For clarity of illustration in FIG. 5, and end cap 33 capping the head portion 12 has been removed, but during use the end cap 33 will be in place completely covering the end of the head portion 12.

In order to prevent evaporation of liquid from applicator 13, and to protect it during transportation or storage, a cover 34 is provided. The cover 34 covers the portion of the sponge 13 extending outwardly from the head portion 12. As illustrated in FIGS. 1 and 6, the cover 34 preferably comprises an elongated generally tubular member open at one end 39 thereof, and closed at the other end 38 thereof. Means are provided defining a slot 36 in cover 34, the slot elongated in the same dimension of elongation as the cover 34 and having a width d', which is about equal to or greater than d, but less than D. Constructed in this way, one can place the open end 39 of the cover 34 over the portion of the sponge 13 extending outwardly from head portion 12, and slide the cover in direction A (see FIG. 1) with the spong adjacent the slot 32 being received by the slot 36, and with the outwardly extending portion of the sponge 13 being received within the hollow interior of the member 34. Preferably the cover 34 also is constructed from a section of plastic pipe generally circular in cross-section, or is otherwise constructed so that the exterior surfaces 42 thereof adjacent slot 36 do not interfere with exterior surfaces 43 of head portion 12 adjacent slot 32. The surfaces 42, 43 substantially abut during sliding movement between cover 34 and head 12. If desired, a cap 41 extending downwardly from head portion (shown in FIG. 1 but not shown in FIG. 5) may be provided against which the open end 39 of the cover 34 abuts.

Although the device 10 according to the present invention has a wide variety of uses, it will now be described with one particular use, that of applying a liquid contact herbicide (such as ROUNDUP by Monsanto) to plants.

The pipe sections 23, 24 are assembled clamping the outer annular portion 17 of the valve disc 16 therebetween, the sponge 13 is pushed through slot 32 into operative association with the head portion 12, and the head portion 12 is placed in operative engagement with handle portion 24 so that an open passageway 25 is provided between the handle portion 24 and the head portion 12 with sponge 13. An operator then pours liquid herbicide through open end 15 of handle portion 23 into the reservoir R, and places flexible end cap 28 over end portion 15 to seal it.

In order to provide liquid to the sponge 13, the operator pushes flexible cap 28 in, allows it to return, and pushes it in again any desired number to times, depending upon the amount of liquid desirably applied to the sponge 13 for a particular application. Upon each flexing of the cap 28 the inner annular portion 18 of valve disc 16 flexes, allowing the passage of a predetermined amount of liquid through the slit 20. When pressure is equalized on opposite sides of the valve means 16, with air passing upwardly through slit 20 into reservoir R, the inner annular portion 18 returns to its normal position (FIG. 3) and no liquid can flow through the slit 20.

Contact herbicide flows through handle lower portion 24, open passageway 25, and the head portion 12, and contacts the sponge 13. As the sponge becomes wet, some of the liquid passes in the sponge outwardly of the head portion 12. When the outer portion of the sponge 13 is brought into contact with plants, liquid herbicide from the sponge contacts the plants, effecting destruction thereof.

When the device 10 is to be transported or stored, the open end 39 of cover 34 is placed over the end of the sponge 13 adjacent end cap 33, and a force is applied in direction A to slide cover 34 so that slot 36 thereof receives a central portion of the sponge 13, and so that eventually the cover 34 covers the sponge.

It will thus be seen that according to the present invention a simple, versatile, and effective liquid applicator device, and valve assembly thereof, have been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest intepretation of the appended claims so as to encompass all equivalent structures and devices.

What is claimed is:

1. A liquid applicator comprising
a head portion including a sponge liquid applicator material and means for holding said sponge so that part of said sponge is within said head portion, and part of said sponge extends outwardly from the head portion, and said sponge has generally a figure 8 shape in end view, said means for holding said sponge comprising: means defining a slot in said head portion elongated in the same dimension as the dimension of elongation of said head portion; and further comprising a cover for said sponge portion extending outwardly from said head portion, said cover comprising an elongated generally tubular piece of plastic pipe circular in cross-section and open at one end and having means defining a slot therein, said slot elongated in the same dimension as the dimension of elongation of said cover; and wherein said head portion and said cover have means defining exterior surfaces thereof adjacent said slots, which surfaces substantially abut each other when said slots and said cover and said head portion are adjacent each other and extend in the same dimension, with said cover engaging and surrounding said portion of said sponge extending outwardly from said head portion;
a handle portion operatively connected at one end thereof to said head portion, the other end being free;
valve means consisting of fluid pressure responsive valve means operatively positioned between said liquid applicator material and said handle free end;
means defining a liquid reservoir adjacent said valve means, with liquid in contact with said valve means on the opposite side thereof as said liquid applicator material; and
air pump means for pressurizing liquid in said reservoir to pass only a predetermined amount thereof through said pressure responsive valve means into contact with said liquid applicator material.

2. A liquid applicator device as recited in claim 1 wherein said head portion includes a cap abutment extending outwardly from said head portion adjacent said slot against which said cover abuts when said cover engages and surrounds said portion of said sponge extending outwardly from said head portion.

3. An applicator as recited in claim 1 wherein said valve means comprises a plug of flexible, resilient material, and means defining a slit in said plug extending from one end thereof to the other, said slit normally maintained by the flexible, resilient material of said plug in a position preventing passage of liquid therethrough, but allowing passage of liquid therethrough when said plug is pressurized, and allowing return of air therethrough after pressurization.

4. An application as recited in claim 3 wherein said handle is hollow and in two pieces, and of circular cross-section; and said valve means is disposed at a junction of said handle two pieces and within said handle between said free end thereof and said head portion, and wherein said liquid reservoir is the hollow interior of said handle between the free end thereof and said valve means.

5. An applicator as recited in claim 4 wherein said air pump means comprises a continuous, unapertured cap of flexible, resilient material disposed on and over the exterior of said handle free end, and closing said free end.

6. An applicator as recited in claim 5 wherein said cap is of rubber.

7. An application as recited in claim 3 wherein said plug is of rubber.

8. An application as recited in claims 4 or 7 wherein said slit in said plug is about $\frac{1}{4}''-\frac{3}{8}''$ long.

* * * * *